US006526583B1

United States Patent
Auld et al.

(10) Patent No.: US 6,526,583 B1
(45) Date of Patent: Feb. 25, 2003

(54) INTERACTIVE SET-TOP BOX HAVING A UNIFIED MEMORY ARCHITECTURE

(75) Inventors: David R. Auld, San Jose, CA (US); Bruce K. Holmer, Belmont, CA (US); Hong-Jyeh Jason Huang, San Mateo, CA (US); Gerard K. Yeh, Redwood City, CA (US)

(73) Assignee: Teralogic, Inc., Mountain View, CA (US)

( * ) Notice: Subject to any disclaimer, the term of this patent is extended or adjusted under 35 U.S.C. 154(b) by 0 days.

(21) Appl. No.: 09/263,454

(22) Filed: Mar. 5, 1999

(51) Int. Cl.$^7$ ............ H04N 7/173; H04N 7/16; H04N 9/475; G06F 15/16; G06T 1/00
(52) U.S. Cl. ............ 725/139; 725/131; 725/139; 725/151; 348/513; 348/518; 348/547; 709/211; 711/151; 712/31; 345/418
(58) Field of Search ............ 725/39, 131, 151, 725/139; 348/513, 518, 547, 526, 550, 715–716, 194; 711/5, 151, 158, 147–153; 710/40–45, 240–244; 345/418–475, 501–526, 531, 530, 534, 547; 709/211; 712/31

(56) References Cited

U.S. PATENT DOCUMENTS

| | | | | |
|---|---|---|---|---|
| 5,369,444 A | * | 11/1994 | Ersoz et al. ............ | 348/598 |
| 5,488,389 A | * | 1/1996 | Nakanishi et al. ............ | 345/131 |
| 5,553,220 A | * | 9/1996 | Keene ............ | 395/154 |
| 5,557,733 A | * | 9/1996 | Hicok et al. ............ | 395/162 |
| 5,598,115 A | * | 1/1997 | Holst ............ | 326/119 |
| 5,680,591 A | * | 10/1997 | Kansal et al. ............ | 395/517 |
| 5,889,949 A | * | 3/1999 | Charles ............ | 395/200.44 |
| 5,926,647 A | * | 7/1999 | Adams et al. ............ | 395/800.36 |
| 5,936,677 A | * | 8/1999 | Fries et al. ............ | 348/512 |
| 6,037,995 A | * | 3/2000 | Yasuhisa et al. ............ | 725/40 |
| 6,049,333 A | * | 4/2000 | LaJoie et al. ............ | 345/328 |
| 6,067,098 A | * | 5/2000 | Dye ............ | 345/521 |
| 6,104,417 A | * | 8/2000 | Nielsen et al. ............ | 345/521 |
| 6,311,268 B1 | * | 10/2001 | Chu ............ | 713/1 |
| 6,384,723 B1 | * | 5/2002 | Keeler et al. ............ | 340/513 |

* cited by examiner

*Primary Examiner*—Andrew Faile
*Assistant Examiner*—Son P. Huynh
(74) *Attorney, Agent, or Firm*—Blakely, Sokoloff, Taylor & Zafman LLP

(57) ABSTRACT

According to one embodiment, a graphics/video processor includes a memory controller. The memory controller includes a first arbiter that receives memory client requests to access a memory device, and a first memory buffer coupled to the first arbiter. The first arbiter stores client requests that are selected by the first arbiter. The memory controller also includes a second arbiter coupled to the first memory buffer and a second memory buffer coupled to the second arbiter. The second arbiter receives requests from the memory client requests stored in the first memory buffer. The second memory buffer stores the client requests selected by the second arbiter. Further, the memory controller includes a third arbiter coupled to the second memory buffer. The third arbiter provides access of the memory device to the client requests stored in the second memory buffer.

36 Claims, 12 Drawing Sheets

INTERACTIVE SET-TOP BOX HAVING A UNIFIED MEMORY ARCHITECTURE

FIELD OF THE INVENTION

The present invention relates to interactive television systems; more particularly, the present invention relates to an interactive set-top box operating according to a Unified Memory Architecture.

BACKGROUND

Recently, the popularity of interactive televisions [ITVs] have increased. An ITV is the meeting of television with new interactive technology that takes advantage of current data transferring technology, such as coaxial cable (cable TV cable) or twist copper pair (telephone wire). Typically, ITV is facilitated through an advanced terminal, or set-top box. The set-top box allows users to communicate with an ITV system in order to make perform operations as search the Internet, choose movies, order from catalogs, play games, watch videos, take classes, search through archives, read newspapers, and more.

FIG. 1 is a block diagram of a set-top box 100. Set-top box 100 includes a Central Processing Unit (CPU) 105 and a Motion Picture Experts Group (MPEG) decoder/graphics processor 115. CPU 105 is coupled to a memory 107 and MPEG decoder/graphics processor 115 is coupled to memory 117. Additionally, MPEG decoder/graphics processor 115 is coupled to a display unit. Set-top box 100 may be typically used in applications requiring limited data services. However, in modern ITV systems requiring enhanced data services, set-top box 100 is inadequate.

One problem with set-top box 100 is that memory 117 is not sufficiently large to service both the MPEG decoder and graphics processor applications of MPEG decoder/graphics processor 115. Consequently, the graphics processor operations of MPEG decoder/graphics processor 115 are restricted to four-bit simple graphics, resulting in inadequate color depth. Another problem with set-top box 100 is that the performance interface is not fast enough.

FIG. 2 is a block diagram of a set-top box 200. Set-top box 200 includes a CPU 205, an MPEG decoder 215 and a graphics processor 225. CPU 205 is coupled to a memory 207, while MPEG decoder 215 and graphics processor 225 are coupled to memories 217 and 227, respectively. Graphics processor 225 is also coupled to a display unit. The configuration of set-top 200 solves the deficiencies associated with set-top box 100 by including a separate memory for the operations of graphics processor 225. Nevertheless, adding a separate memory to service graphics processor 225 results in an incremental price increase in the manufacturing of set-top boxes. Therefore, a set-top box that supports enhanced data services without adding a separate memory for graphics functions is desired.

SUMMARY OF THE INVENTION

According to one embodiment, an interactive set-top box includes a memory device and a graphics/video processor coupled to the memory device. In addition, the set-top box includes a central processing unit (CPU) coupled to the graphics/video processor and the memory device. Access to the resources of the memory device is shared by the CPU and the graphics processor.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
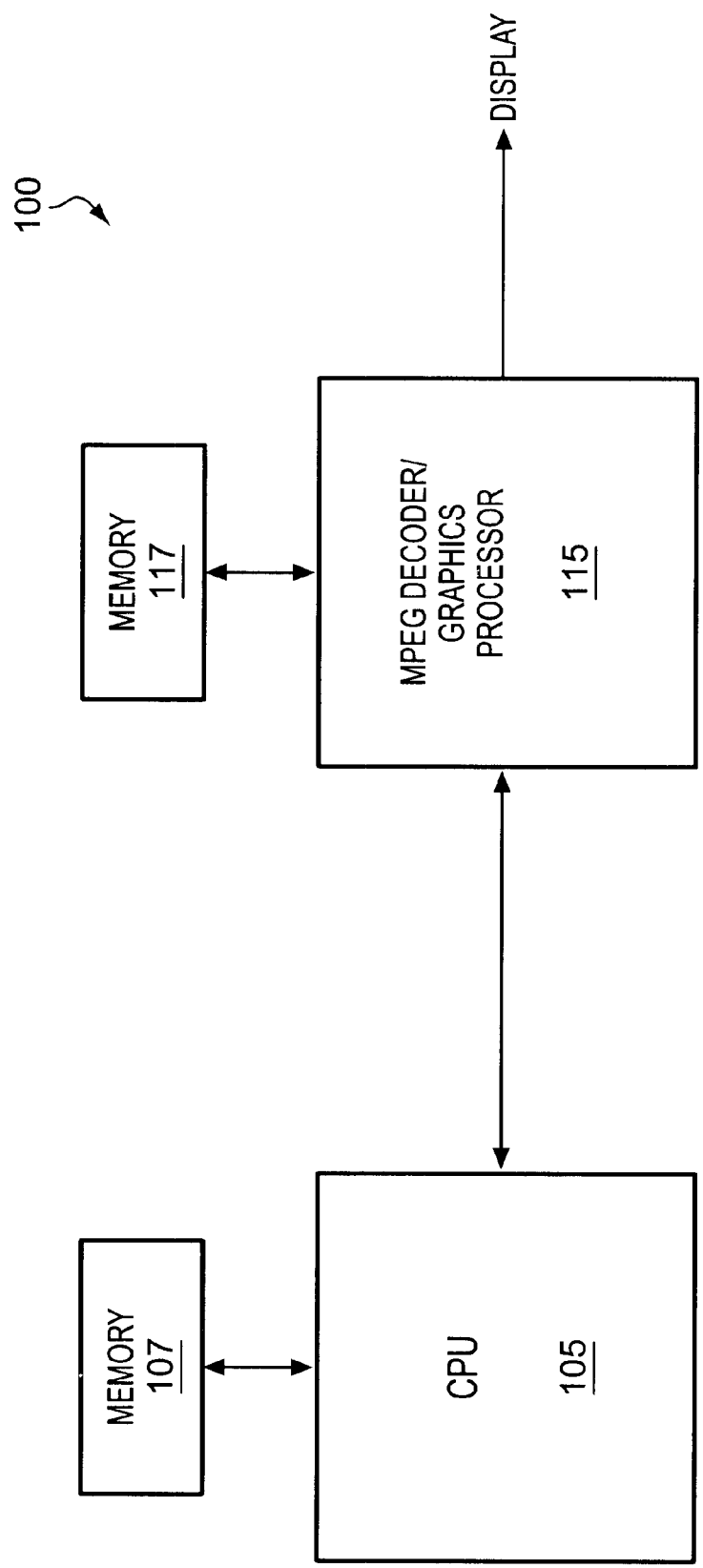
FIG. 1 is a block diagram of an exemplary set-top box.
Figure 2:
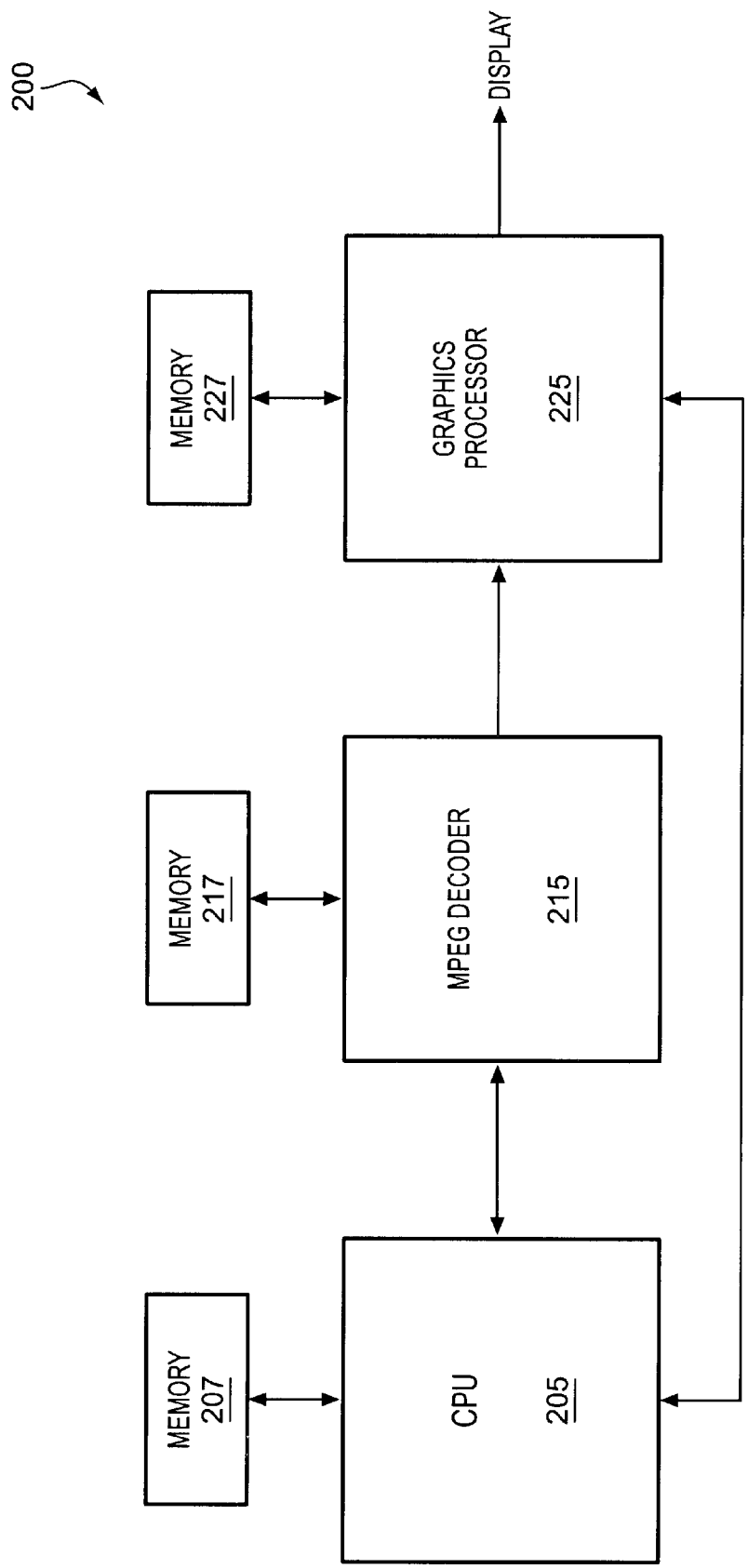
FIG. 2 is a block diagram of an exemplary set-top box.

An interactive set-top box having a Unified Memory Architecture (UMA) is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magneto-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

The programs including executable instructions may be executed by one or more programming devices (e.g., a central processing unit (CPU), processor, controller, etc.) in one or more personal computer systems, servers, workstations, etc.

Unified Memory Architecture

Figure 3:
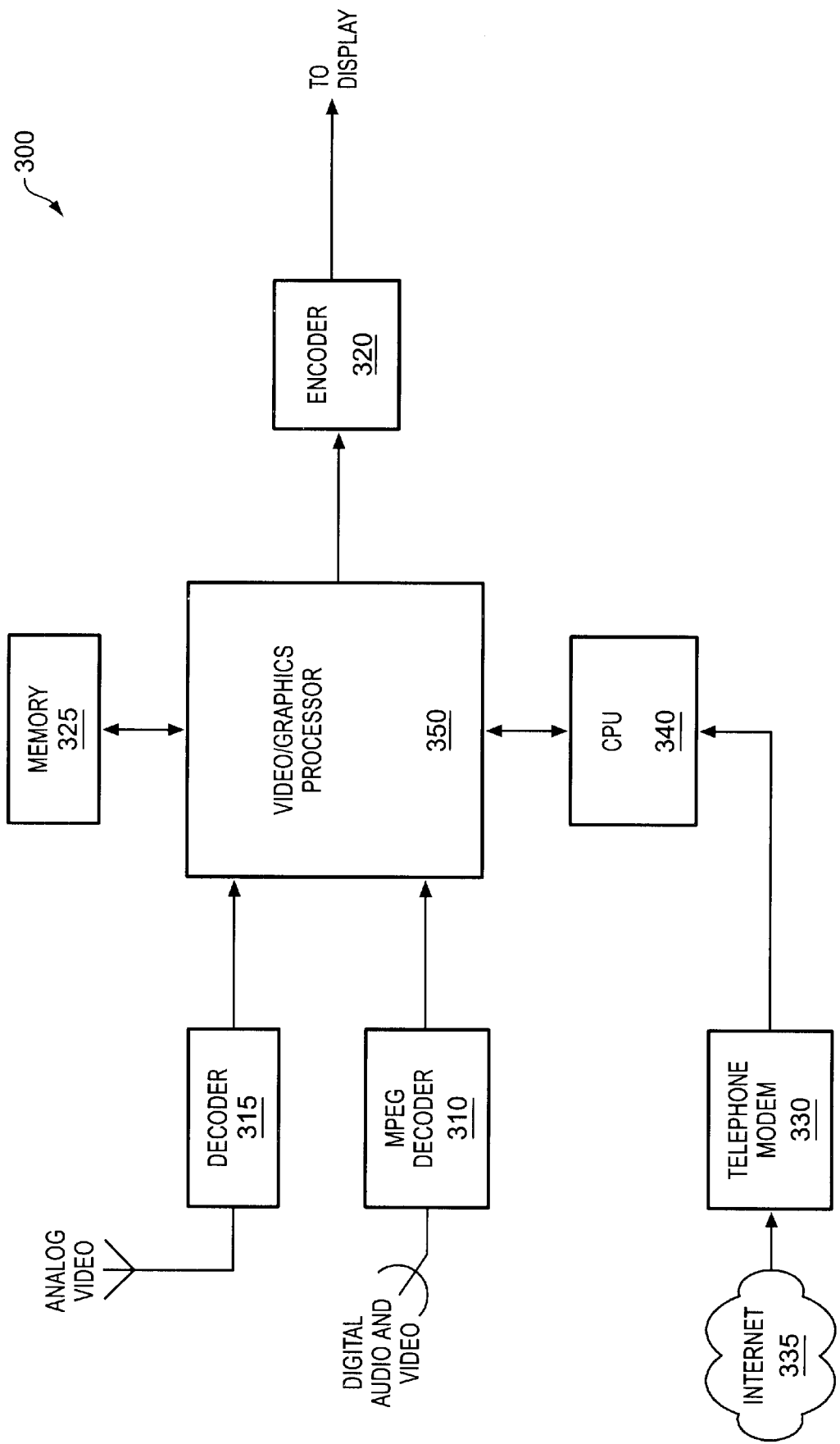
FIG. 3 is a block diagram of one embodiment of a set-top box.

FIG. 3 is a block diagram of one embodiment of a set-top box 300. Set-top box 300 includes a Motion Picture Experts Group (MPEG) decoder 310, a decoder 315, an encoder 320 and a memory 325. In addition, set-top box 300 includes a telephone modem 330 that provides access to Internet 335. Further, set-top box 300 includes a Central Processing Unit (CPU) 340 and a video/graphics processor (VGP) 350. Set-top box 300 may be a Smart Set-top Decoder. Alternatively, set-top box 300 may be an Internet TV box, a Smart Television, an Internet Television, a Digital Video Disc (DVD) system, etc.

MPEG decoder 310 receives and decompresses digital audio and video before it is downloaded into set-top box 300. According to one embodiment, MPEG decoder 310 implements the MPEG-2 compression standard. However, other MPEG related MPEG standards, such as the MPEG-1 or MPEG-4 standard, may be used. In addition, non-MPEG standards may be used. Decoder 315 receives composite analog video signals and separates the RGBS (red, green, blue and sync) signals from the video signal. Decoder 315 may be implemented using the National Television System Committee (NTSC) Standard. However, other standards, such as the Phase Alternate Line (PAL), or NTSC/PAL may be used to implement decoder 315.

Encoder 320 converts individual components of signals into composite signals. For example, encoder 320 combines Y (luminance) and C (chrominance) signals to produce a video image. Encoder 320 may also be implemented using the NTSC Standard. Additionally, the PAL and other standards may be used to implement encoder 320. Encoder 320 is coupled to a display unit (not shown) that displays the graphics and video data transmitted from set-top box 300. Further, additional encoders 320 may be included in set-top box 300 in order to provide data to multiple display devices. For example, one encoder 320 may be coupled to a television display device, while another encoder 320 may be coupled to a VCR.

Memory 325 is coupled to VGP 350 and CPU 340 through VGP 350. Memory 325 stores sequences of instructions that are executed by CPU 340 and VGP 350. In one embodiment, memory 325 may be a synchronous dynamic random access memory (SDRAM). However, main memory 325 may be implemented using other memory types such as, for example, an extended data output DRAM (EDO DRAM). Telephone modem 330 modulates outgoing digital signals received from CPU 340 to analog signals before transmission to Internet 335. Also, modem 330 demodulates incoming analog signals from Internet 335 and converts them to digital signals before transmission to CPU 340.

CPU 340 is coupled to telephone modem 330 and VGP 350 and executes software program instructions used by set-top box 300. As described above, CPU 340 accesses the resources of memory 325 by first accessing VGP 350. VGP 350 may be coupled to MPEG decoder 310, decoder 315, encoder 320, memory 325 and CPU 340. VGP 350 processes digital audio and video data received from MPEG decoder 310, as well as analog video data received from decoder 315. In addition, VGP 350 produces high quality graphics.

Figure 4:
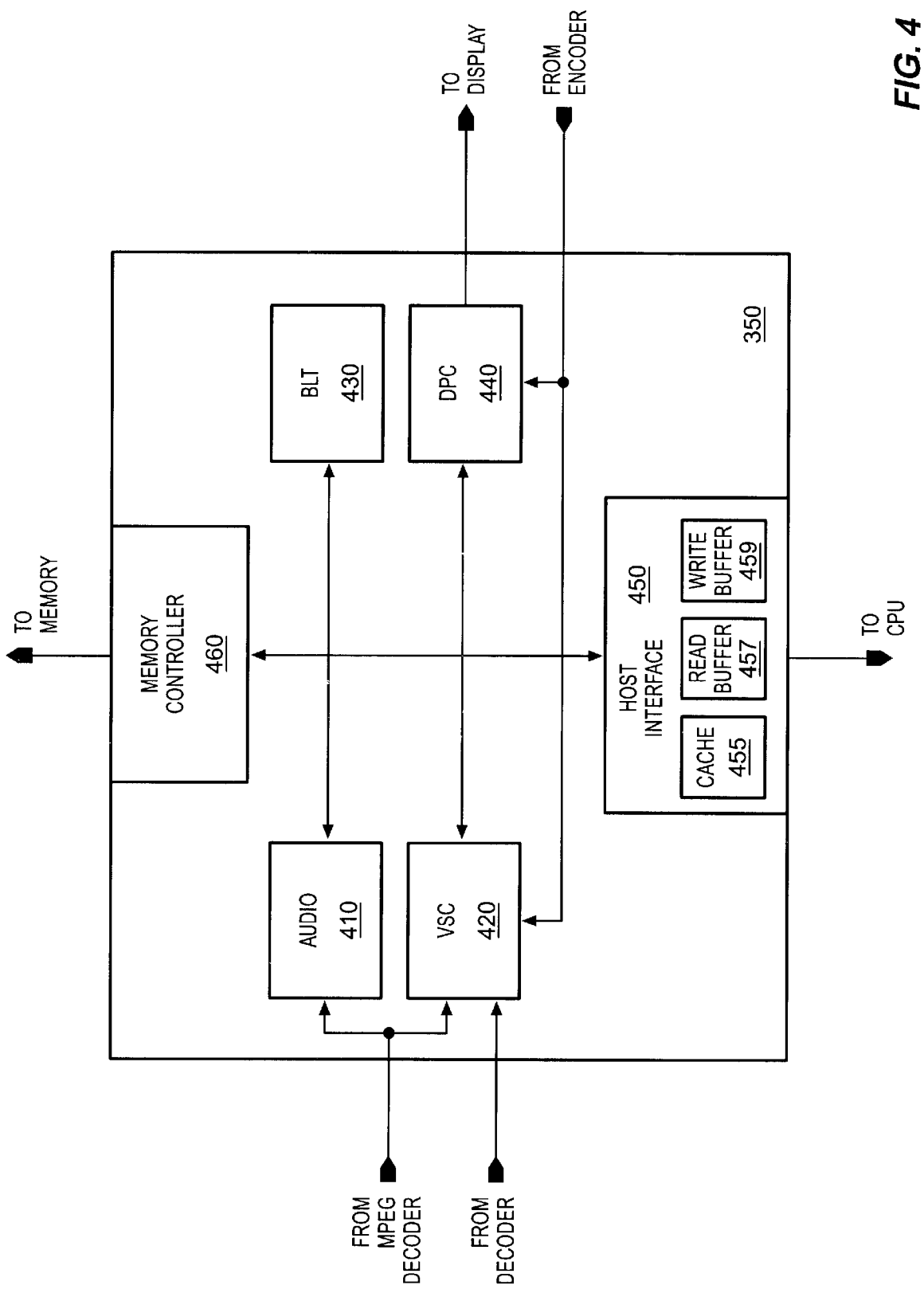
FIG. 4 is a block diagram of one embodiment of a video/graphics processor.

FIG. 4 is a block diagram of one embodiment of VGP 350. VGP 350 includes audio unit 410, video capture and scaling unit (VSC) 420, bit block transfer unit (BLT) 430, display controller (DPC) 440, host interface (HIF) 450 and memory controller 460. Audio unit 410 receives digital audio data from MPEG decoder 310. According to one embodiment, audio unit receives and transmits three (3) stereo serial streams of audio data. Additionally, audio unit 410 may include an audio processor that processes data received at audio unit 410. In other embodiments, separate audio capture and audio processor units may be included within VGP 350. Nevertheless, the processed and/or received data may be stored in memory 325. Alternatively, audio data received at audio unit 410 may be passed directly out of set-top box 300 without being stored or processed.

VSC 420 captures video data received from MPEG decoder 310 and decoder 315. VSC 420 may include two inputs wherein one of the inputs may be passed directly to its output. The other video data input may be scaled into arbitrary sizes before being stored at memory 325. Alternatively, one of the video data inputs may be both scaled and directly routed to the output of VSC 420. Scaling operations of VSC 420 may be performed using a horizontal and vertical scaler.

BLT 430 is a graphics accelerator that is capable of performing a comprehensive set of functions on two-dimensional pixel maps in a variety of pixel map formats. In one embodiment, BLT 430 may support such pixel formats as 1$i$, 4$i$, 8$i$, 4$a$, 8$c$, 16$c$, 24$c$, 4$a$12$c$, 8$a$24$c$, 8$a$8$i$, 15$c$ and YCbCr. However, one of ordinary skill in the art will recognize that BLT 430 may be designed to support other pixel map formats.

DPC 440 provides the formatting of video data in memory 325. Moreover, DPC 440 transmits video and graphic images from set-top box 300 to one or more output display units. DPC 440 may also be used to composite planes of graphics and video objects (e.g., background, video, graphics and cursor planes) and present the resulting video image on the output display units. For example, one of the output display units may display the background, video, graphics and cursor planes, while another output display unit may display the background and video planes only. In addition, one of the outputs of DPC 440 may be used to record video to a VCR or other recording media.

Host interface 450 provides high performance access of memory 325 to CPU 340. In one embodiment, host interface 450 includes a cache 455 that services CPU 340 memory transactions. Cache 455 may be a small, high speed memory that stores the most recently used instructions or data previously retrieved from memory 325. Since programs executed by CPU 340 typically use a subset of instructions or data repeatedly, cache 455 is an efficient method of servicing CPU 340 transactions without having to always resort to memory 325. For example, whenever CPU 340 performs a read operation, it will first check to see if the data or instruction it requests is in cache 455. If the data is stored in cache 455, the cache provides the data very quickly to the CPU 340, without having to access memory 325.

If the data or instruction needed by CPU 340 is not in cache 455, it is fetched from memory 325. In addition, a copy of the data or instruction may be stored in cache 455. Thus, host interface 450 may also include a read buffer 457 and a write buffer 459 for supporting CPU 340 read and write transactions, respectively, with memory 325. According to one embodiment, cache 455 may be implemented using a 2 kByte cache with a line length of 16 or 32 bytes. Nevertheless, other cache configurations may be implemented. Further, a cache may be included within CPU 340. In such an embodiment, cache 455 may be disabled.

Memory controller 460 accesses memory 325 for memory transactions based upon commands received from CPU 340 or other components. Particularly, memory controller coordinates access to memory 325 by various clients, such as audio unit 410, DPC 440, host interface 450, etc. Memory controller 460 may read data from, and write data to, memory 325.

Memory Controller

Figure 5:
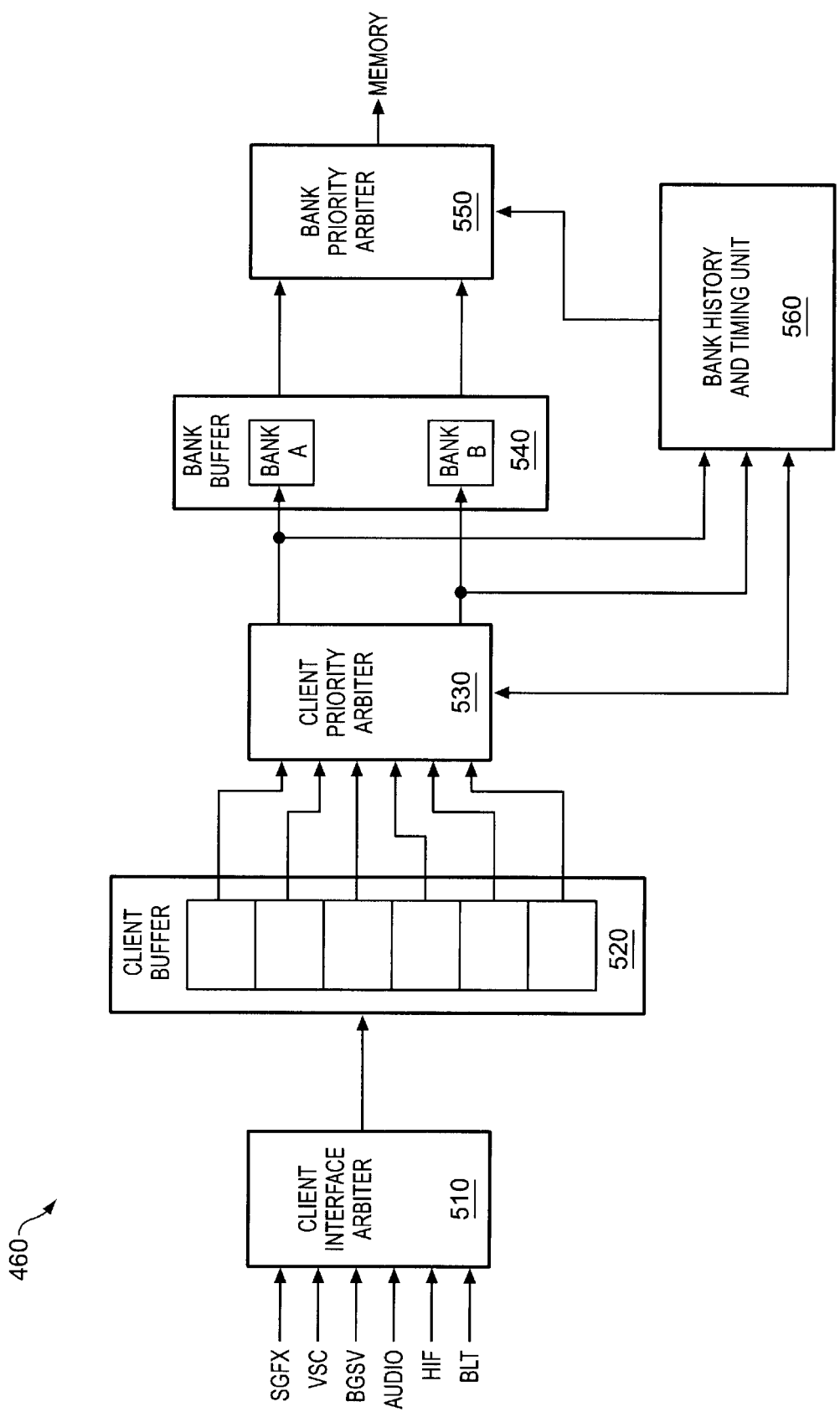
FIG. 5 is a block diagram of one embodiment of a memory controller.

FIG. 5 is a block diagram of one embodiment of memory controller 460. Memory controller 460 includes a client interface arbiter 510, a client buffer 520, a client priority arbiter 530, a bank buffer 540, a bank priority arbiter 550 and a bank history and timing unit 560. Client interface arbiter 510 coordinates access to memory 325 by various client requests. According to one embodiment, client interface arbiter 510 arbitrates between scaled graphics and background graphics requests (SGFX and BGSV) from DPC 440, video scaler write requests (VSC) from VSC 420, audio requests (AUDIO) from audio unit 410, host access requests (HIF) from host interface 450 and graphics copy requests (BLT) from BLT 430. In other embodiments, client interface arbiter may receive additional or different requests from other clients.

Figure 7A:
FIG. 7a illustrates one embodiment of client request rankings.

Client interface arbiter 510 selects requesting clients according to a fixed priority scheme. FIG. 7a illustrates the client request priority rankings implemented by client interface arbiter 510, wherein the SGFX request is ranked highest and the BLT request is ranked lowest. A client may only compete for access to memory 325 if there is an active request to be serviced. Also, space must be available in client buffer 520 for the particular type of request. For instance, DPC 440 may arbitrate for control of memory 325 at client interface arbiter 520 if there is an active SGVX or BGSV request. Further, if DPC 440 is requesting SGFX service, there must be space available in client buffer 520 to accept an SGFX request in order for DPC 440 to compete for access. Similarly, if DPC 440 is requesting BGSV service, there must be space available in client buffer 520 to accept a BGSV request.

Figure 8A:
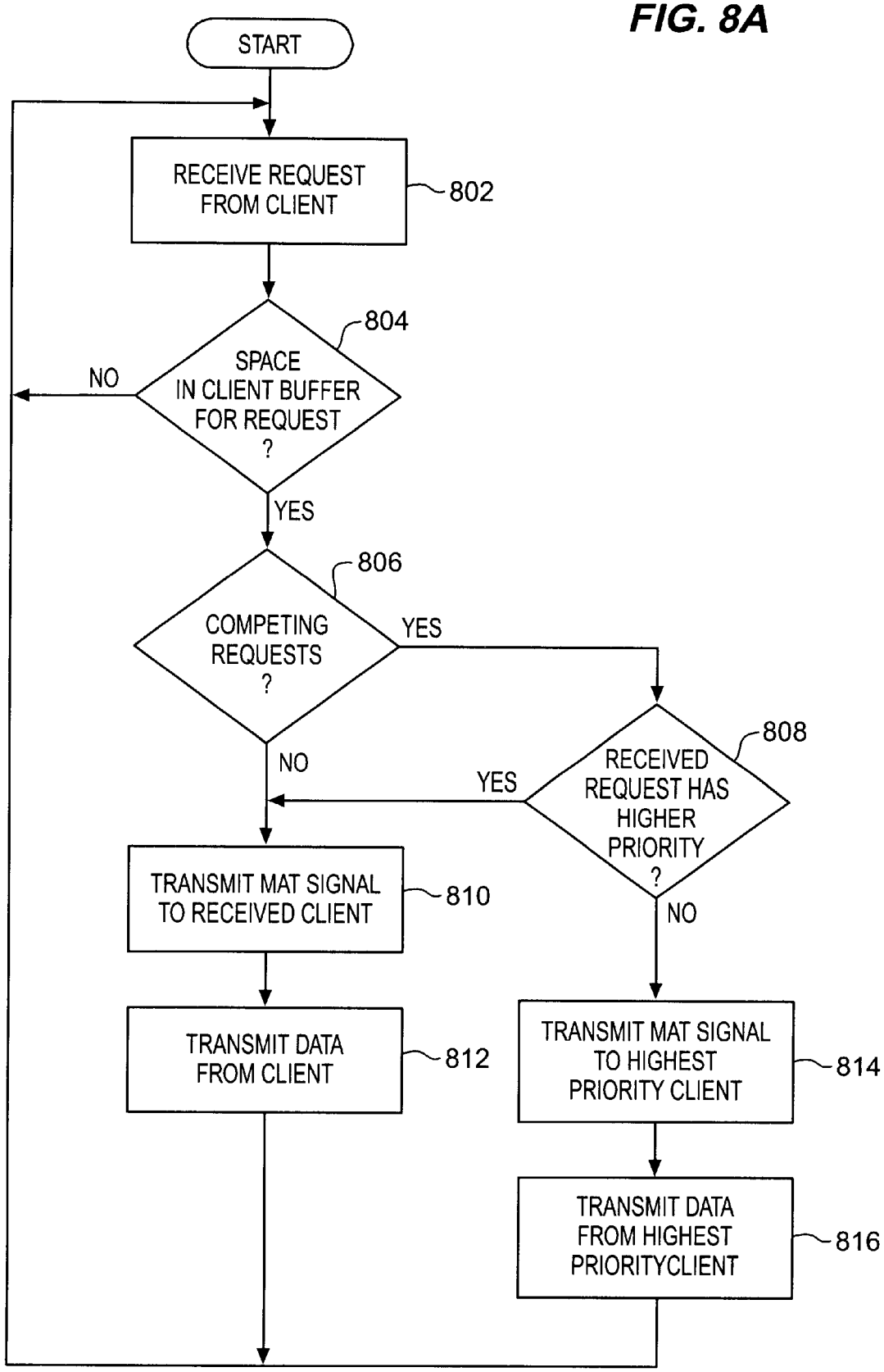
FIG. 8a is a flow diagram of one embodiment of the operation of a client interface arbiter.

Whenever a request is successful at client interface arbiter 510, a memory address transfer (MAT) signal is transmitted to the requesting client. Subsequently, all information regarding the request is transmitted to and stored in an entry of client buffer 520. FIG. 8a is a flow diagram of one embodiment of the operation of client interface arbiter 516. At process block 802, client interface arbiter 510 receives a client request. At process block 804, it is determined whether space is available in client buffer 520 for the received request.

If it is determined that space is not available in client buffer 520, the received request is precluded from arbitrating at client interface arbiter 510 and control is returned to process block 802 where another request is received. If space is available in client buffer 520, it is determined whether other competing requests have been received at client interface arbiter 510, process block 806. If no other requests have been received, a MAT signal is transmitted to the client from which the received request originated, process block 810. At process block 812, information for the received request is transmitted from the client and is stored in an entry of client buffer 520. Subsequently, control is returned to process block 802 wherein another request is received.

If other requests have been received at client interface arbiter 510, it is determined whether the recently received request has a higher priority than the other requests, process block 808. If the recently received request has the highest priority, the MAT signal is transmitted to the client from which the received request originated, process block 810. At process block 812, information for the received request is stored at client buffer 520. Thereafter, control is returned to process block 802 wherein another request is received. However if another request has a higher priority, a MAT signal is transmitted to the higher requesting client, process block 814. At process block 816, information for the higher requesting client is stored in an entry of client buffer 520. Next, control is returned to process block 802 wherein another request is received.

Client buffer 520 stores entries for each request that has prevailed in arbitration at client interface arbiter 510. Client buffer 520 may store one entry for each type of request at any given time. For example, only one HIF request may be stored in client buffer 520 at a time. Subsequent HIF requests received while an HIF request remains in client buffer 520 is precluded from arbitrating at client interface arbiter 510.

Figure 6A:
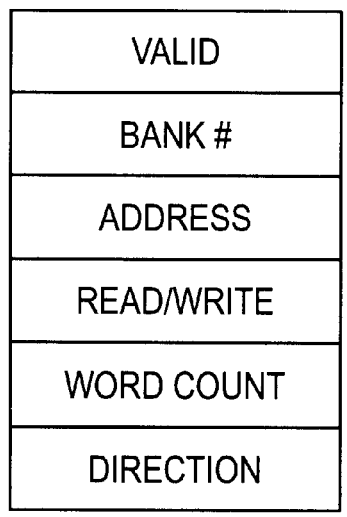
FIG. 6a illustrates one embodiment of a client buffer entry.

FIG. 6a illustrates one embodiment of a client buffer 520 request entry. Each request entry includes a VALID field which indicates that a request is stored in a particular location of client buffer 520. Whenever a client transfers data to a storage location in client buffer 520 the VALID field of the location is enabled. Conversely, whenever data is transferred out of a client buffer 520 location, the VALID field is disabled. Each client buffer entry also includes a BANK# field which indicates which bank in memory 325 the request will access. According to one embodiment, memory 325 may include four banks that are accessed by client requests. Alternatively, other quantities of memory banks may be included in memory 325.

Further, each client buffer 520 entry includes ADDRESS, READ/WRITE, WORD COUNT and DIRECTION fields.

The ADDRESS field indicates the address in memory 325 that the request is to access; READ/WRITE indicates the type of service that is requested at memory 325; WORD COUNT indicates the amount of data included in a particular memory 325 transaction, and the DIRECTION field indicates whether a multiword memory access is for increasing memory addresses (i.e., forward) or for decreasing memory addresses (i.e., backward).

Client priority arbiter 530 coordinates access to memory 325 by the client requests that are stored in client buffer 520. Client priority arbiter 530 arbitrates between the same client requests as described above with respect to client interface arbiter 510 (e.g., SGFX, BGSV, VSC, AUDIO, HIF and BLT). However, client priority arbiter 530 selects requesting clients according to a priority scheme that is different from that of client interface arbiter 510.

Figure 7B:
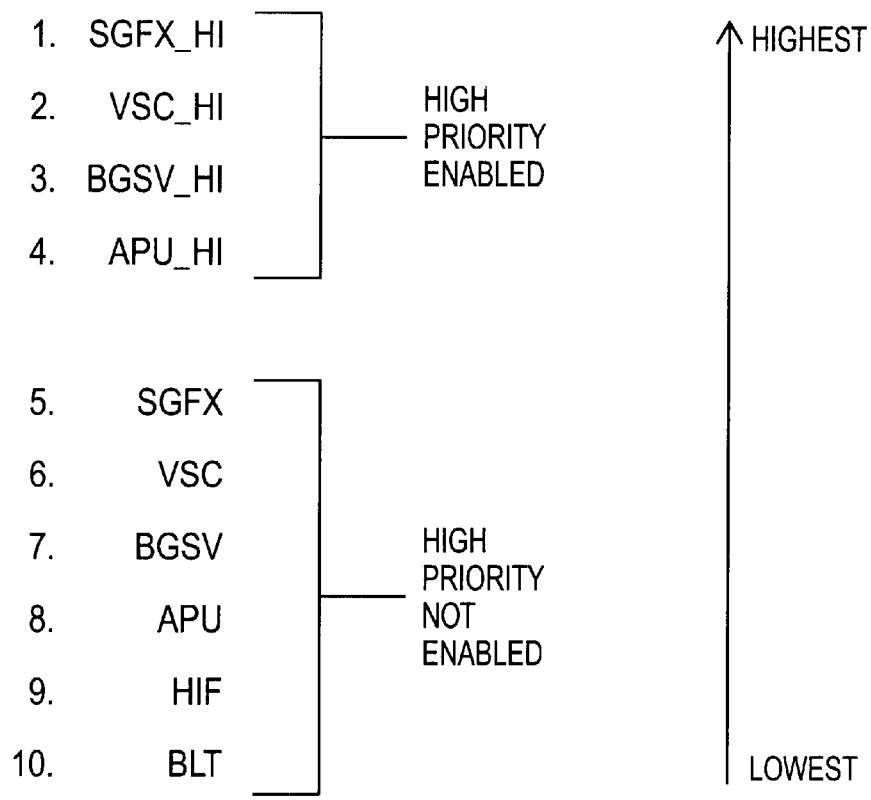
FIG. 7b illustrates one embodiment of client request rankings.

FIG. 7b illustrates the client request priority rankings implemented by client priority arbiter 530, wherein the SGFX request is ranked highest and the BLT request is ranked lowest. However, if client priority arbiter 530 receives a high priority enable signal from a requesting client, the request is elevated to a higher priority than other clients that have not transmitted a high priority enable signal. Note that the HIF and BLT requests are not included in the "high priority enabled" group. The HIF and BLT requests are excluded since they are not critical requests.

The priority scheme implemented in client priority arbiter 530 prevents lower priority clients from being starved from memory 325 services. For example, if a VSC request is competing against an SGFX request at client priority arbiter 530 and VSC 430 is asserting a high priority enable signal, the VSC request prevails provided that DPC 440 is not asserting a high priority enable signal with respect to the SGFX request.

According to one embodiment, clients that conduct read transactions assert a high priority enable signal if the client has ninety (90) or less clock cycles before it runs out of data from memory 325 in its local buffer. Similarly, clients that conduct write transactions assert a high priority enable signal if in 90 or less clock cycles the clients local buffer will overflow if not transmitted to memory 325. However, it will be appreciated that other thresholds may be used to determine whether a high priority enable signal is asserted.

Arbitration at client priority arbiter 530 is precluded whenever bank buffer 540 is full or either bank within bank buffer 540 has an active read or write transaction command with greater than four (4) words remaining to transmit to or from memory 325. In addition, arbitration is precluded if bank buffer 540 contains a pending row activate command. These restrictions permit high priority requests to enter client buffer 520 before an ensuing arbitration cycle at client priority arbiter 530.

Further a client request is precluded from arbitrating at bank priority buffer 530 if it is to access the same bank of memory 325 as a request that is currently pending in bank buffer 540. Specifically, if the BANK# field for the request stored in client buffer 520 matches a BANK# field for a request pending in bank buffer 540, the bank priority buffer 530 request is precluded from participating in the arbitration at bank priority arbiter 530. Upon a request succeeding in the client interface arbitration, the corresponding information stored in client buffer 520 is transmitted to and stored in bank buffer 540 and bank history and timing unit 560.

Figure 8B:
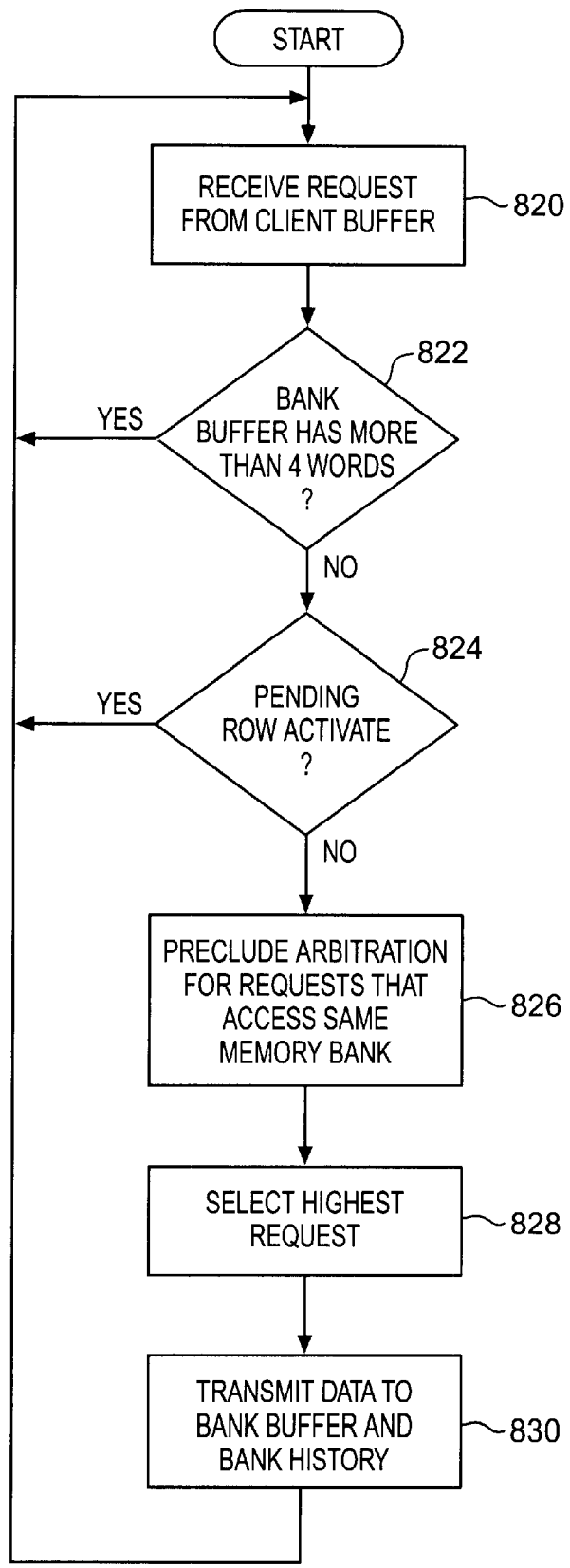
FIG. 8b is a flow diagram of one embodiment of the operation of a client priority arbiter.

FIG. 8b is a flow diagram of one embodiment of the operation of client priority arbiter 530. At process block 820, client priority arbiter 530 receives requests from entries in client buffer 520. At process block 822, it is determined whether bank buffer 540 is full or has greater than 4 words remaining to transmit to or from memory 325. If greater than 4 words of data remain in bank buffer 540, arbitration at client priority arbiter 530 is precluded and control is returned to process block 820 where more requests are received at client priority arbiter 530.

If 4 words of data, or less, are stored in bank buffer 540, it is determined whether bank buffer 540 contains a row activate command, process block 824. If a row activate command is pending, arbitration at client priority arbiter 530 is precluded and control is returned to process block 820 where more requests are received at client priority arbiter 530. However, if no row activate command is pending, client priority arbiter 530 ascertains which client requests stored in client buffer 520 are designated to access the same bank of memory 325 as a request pending in bank buffer 540, process block 826. Client requests stored in client buffer 520 that are designated to access the same bank of memory 325 as a pending bank buffer 540 request are precluded from arbitration at client priority arbiter 530.

At process block 828, client priority arbiter 530 selects the highest priority request in client buffer 520 permitted to arbitrate. At process block 830, the data stored in the selected entry of client buffer 520 is transmitted to bank buffer 540 and bank history and timing unit 560. Subsequently, control is returned to process block 820 where more requests are received.

Figure 6B:
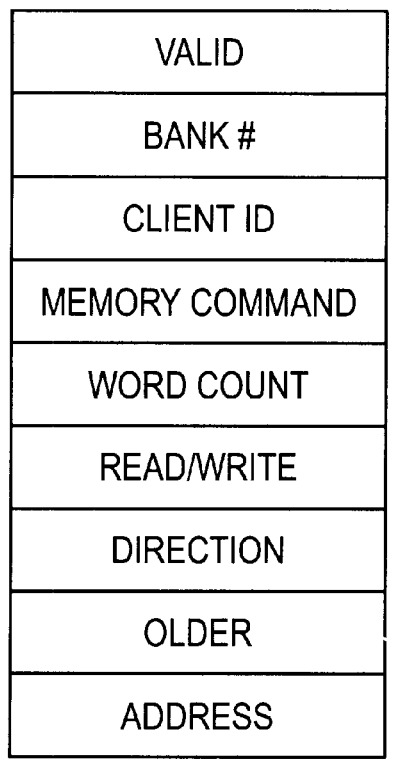
FIG. 6b illustrates one embodiment of a bank buffer entry.

Bank buffer 540 stores entries for the requests that prevailed in arbitration at client priority arbiter 530. Bank buffer 540 includes two banks (Bank A and Bank B). Each bank may store one client request entry at a time. FIG. 6b illustrates one embodiment of a bank buffer 540 entry. Each bank buffer 540 entry includes all of the fields discussed above with respect to client buffer 520. In addition, each entry includes a CLIENT ID field, an OLDER field and a MEMORY COMMAND field.

The CLIENT ID field indicates which client is requesting access to memory 325. The OLDER field indicates which bank (Bank A or Bank B) has been valid the longest. According to one embodiment, a bit is toggled in the OLDER field each time a request is loaded into bank buffer 540. For instance, whenever a request is stored to Bank A, Bank B is marked as OLDER. The MEMORY COMMAND field indicates whether the pending memory command in a bank is a row activate, read, write, precharge or refresh command.

Each client request for memory 325 access in bank buffer 540 goes through four different stages. As a client request is transmitted to bank buffer 540 the access enters the row activate stage. Consequently, the MEMORY COMMAND field indicates that the pending memory 325 command is a row activate command. The access remains in the row activate stage until after the row activate command has been executed. Subsequently, the access enters the read or write stage, depending upon the type of transaction. The MEMORY COMMAND field indicates that the pending memory command is a read or write command.

In the read/write stages, data begins to be transmitted to one of the memory 325 banks after being enabled by bank history and timing unit 560. As the data is being transmitted to memory 325, the WORD COUNT field is continuously decremented to indicate the amount of data remaining to be transferred. Once the WORD COUNT field is decremented to zero, the access, and the MEMORY COMMAND field, enters a precharge stage. The precharge stage indicates that a precharge command is pending in bank buffer 540. After the precharge command has been executed, the bank buffer 540 bank that executed the precharge command enters an invalid stage. Once a bank enters the invalid stage, other client requests may arbitrate at client priority arbiter 530 (subject to the previously described conditions) for access to the available bank. One of ordinary skill in the art will appreciate that various of the above-mentioned stages may be combined. For example, the read/write and precharge stages may be combined in cases where an auto precharge command has been issued.

Bank priority arbiter 550 coordinates access to memory 325 by the client requests that are stored in bank buffer 540. Bank priority arbiter 550 selects memory accesses based upon whether the commands stored in Bank A and Bank B are CAS (i.e., read and write) commands or non-CAS (i.e., row activate, precharge and refresh) commands. If a CAS command from one bank is in progress (i.e., client request data transactions), that bank continues to win the arbitration until its access of memory 325 is completed.

If a CAS command has been recently received in a bank (e.g., Bank B), it will win arbitration at bank priority arbiter 550 only if the last CAS command that gained access to memory 325 was from the other bank (e.g., Bank A). This arbitration condition occurs regardless of whether the access pending in the other bank is a CAS or non-CAS command. The determination of the last bank to gain access of memory 525 is based upon information stored in the bank history and timing unit 560. In essence, recently received CAS command accesses at Bank A and Bank B win arbitration at bank priority arbiter 550 based upon a strict alternation scheme. Under all other conditions, non-CAS commands in bank buffer 540 win arbitration at bank priority arbiter 550. If both Bank A and Bank B have pending non-CAS commands, Bank A is given priority, and is granted access of memory 325.

The arbitration process at bank priority arbiter 550 is controlled by bank history and timing unit 560. According to one embodiment, a particular bank is enabled for arbitration at bank priority arbiter 550 by bank history and timing unit 560. For example, after Bank A has completed accessing memory 325 and enters the precharge stage, the enablement of Bank A at bank priority arbiter 550 is precluded for a predetermined time interval after the last read/write access. A precharge timer may be included within bank history and timing unit 560 for enabling the particular bank after expiration of the predetermined time interval.

In addition, bank history and timing unit 560 disables CAS accesses to memory 325 by a particular bank for a predetermined time interval after a row activate command from the bank has been executed. For example, after Bank A wins arbitration and issues a row activate command, Bank A enters the read/write stage. However, the read/write cannot access memory 325 until after a predetermined time interval after the row activate is completed. Bank history and timing unit 560 may include a row activate timer for enabling read/write commands after expiration of the row activate predetermined time interval. According to one embodiment, both the precharge and row activate timers expire after three clock cycles. However, it will be appreciated that other time intervals may be implemented at the timer. Further, the precharge and row activate timers may expire at different times.

Moreover, bank history and timing unit 560 may include a counter that decrements WORD COUNT as request data is transmitted from a bank in bank buffer 540 to memory 325 in the read/write stage. Once WORD COUNT is decremented to zero, the accessing bank enters the precharge stage. In addition, if either Bank A or Bank B is empty, and WORD COUNT for the other bank is decremented to below 4 words of data, client priority arbiter 550 is permitted to select the highest eligible priority request to be transmitted to bank buffer 540, as discussed above.

Bank history and timing unit 560 also maintains cycle counts for time elapsed since the most recent memory command to each bank. The counts maintained are for row activate, read, write, precharge, and refresh accesses to memory 325. Other time intervals required for correct operation of memory 325 are maintained by counters in bank history and timing unit 560. These counters may also inhibit a pending command in bank buffer 540.

Figure 8C:
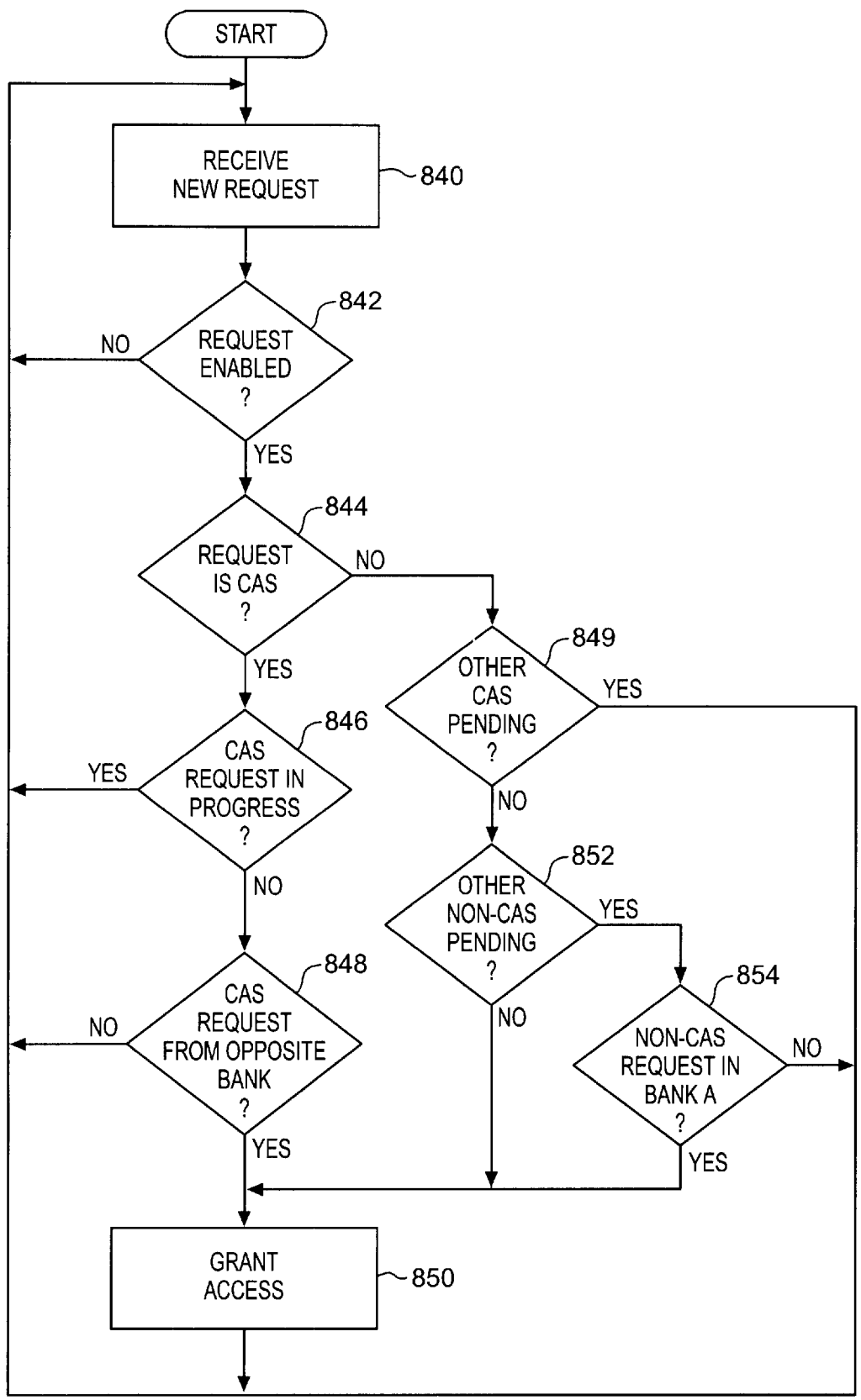
FIG. 8c is a flow diagram of one embodiment of the operation of a bank priority arbiter.

FIG. 8c is a flow diagram of one embodiment of the operation of bank priority arbiter 550. At process block 840, bank priority arbiter 550 receives a new request from an entry in bank buffer 540 to access memory 325. At process block 842, it is determined whether bank history and timing unit 560 has enabled the bank buffer entry to participate in arbitration at bank priority arbiter 550. If it is determined that no bank buffer entries are enabled for arbitration, arbitration is precluded at bank priority arbiter 550 and control is returned to process block 840 where another request may be received at bank priority arbiter 550.

If the bank buffer entry has been enabled for arbitration, it is determined whether the new request is a CAS command, process block 844. If the new request is determined to be a CAS command, it is determined whether a CAS command is currently accessing memory 325, process block 846. If a previously received CAS command is in progress, that CAS command retains access of memory 325 and control is returned to process block 840 where another request may be received at bank priority arbiter 550.

However, if no previously received CAS command is in progress, it is determined whether the new request is from the other bank buffer entry (A or B) with respect to the last CAS command processed, process block 848. If it is determined that the CAS command is not from the other bank, control is returned to process block 840 where another request is received at bank priority arbiter 550. If it is determined that the CAS command is from the other bank, the CAS command is granted access of memory 325, process block 850.

If the new request is a non-CAS command, it is determined whether a CAS command is pending in the other bank that has been granted access, process block 849. If it is determined that no CAS command is pending in the other bank, it is determined whether another non-CAS request is pending, process block 852. If no other non-CAS request is pending, the new non-CAS request is granted access of memory 325, process block 850.

If it is determined that another non-CAS request is pending, it is determined whether the new non-CAS command is stored in Bank A, process block 854. If the new non-CAS command is stored in Bank A, the non-CAS request is granted access of memory 325, process block 850. If the new non-CAS command is stored in Bank B, the non-CAS command in Bank A is granted access and control is returned to process block 840 where another request may be received at bank priority arbiter 550.

Video Buffering

Video fields that are captured at VSC 420 are stored in memory 325 prior to being displayed at a display unit. The video fields received at memory 325 may be stored in its scaled form as well as in its originally received form. Synchronization pattern data may be inserted at the beginning of each field. The synchronization pattern data reflects the field order indicated by synchronization signals received from decoder 315. The video frame data stored in memory 325 is retrieved by DPC 440.

Figure 9:
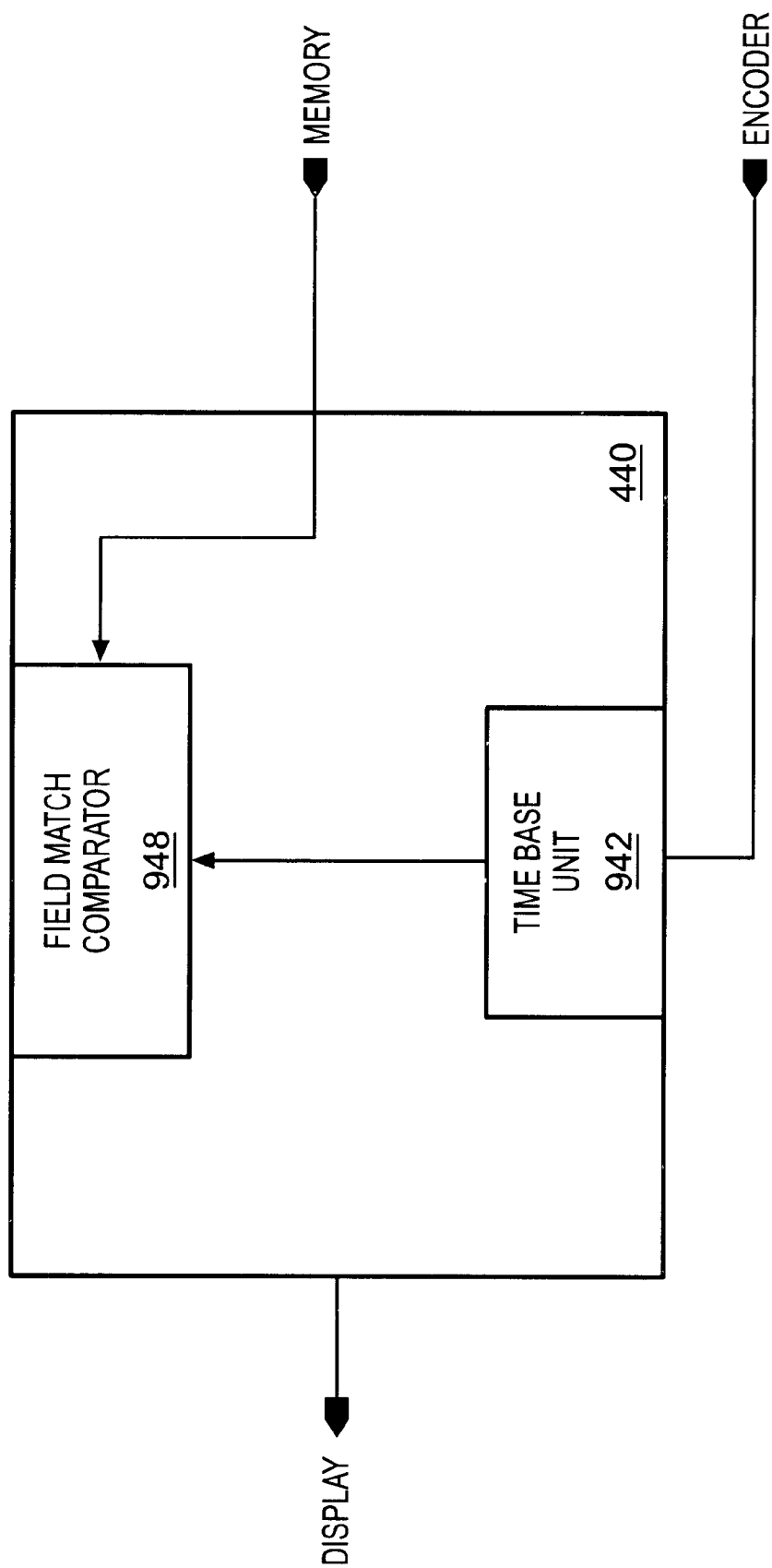
FIG. 9 is a block diagram of one embodiment of a display controller.

FIG. 9 is a block diagram of one embodiment of DPC 440 for handling display synchronization. DPC 440 includes a time base unit 942 and a field match comparator 948. Time base unit 942 receives synchronization signals from encoder 320. Field match comparator 948 is coupled to time base unit 942 and memory 325. Comparator 948 receives the encoder synchronization signals from time base unit 942. In addition, comparator 948 receives synchronization pattern data for each field of video data received at memory 325 from VSC 440. Comparator 948 compares the received synchronization pattern data with the synchronization signals received from time base unit 942.

As video data fields are transmitted to memory 325 from VSC 420, it is subsequently transmitted to DPC 440 in order to be displayed at the display unit. However, there is typically a time offset (or phase) between the synchronization signals received from decoder 315 and those received from encoder 320. The time offset may result in a condition wherein video data captured at VSC 420 may not be from the same field that DPC 440 is currently displaying, thus, causing a field mismatch.

If a field mismatch occurs, video fields are reversed when displayed. The reversing of displayed video fields is commonly referred to as the field inversion effect. Field mismatch may also result in a video image appearing on the display with jagged edges. Consequently, it is typically necessary to buffer three or more video fields in memory 325 in order to ensure that a correct field is available for display. However, due to the necessity of having to buffer three or more video fields, the size of memory 325 must be sufficiently large. Therefore, a method for synchronizing video data being stored in and retrieved from memory 325 by buffering less than three video data fields in memory 325 is provided.

According to one embodiment, two data fields are stored in memory 325 at any one time. Each video field stored in memory 325 contains up to two hundred and forty (240) lines. Additionally, one of the video fields stored in memory 325 corresponds with the top component of the image to be displayed, while the other field corresponds with the bottom component. DPC 440 retrieves any complete field that is present in memory 325 at the time encoder 320 indicates it is to transmit a field of data to the display. For example, the timing provided by encoder 320 may indicate that DPC 440 is to transmit a top field to the display. However, due to the unknown timing of the transmission of data to memory 325 from VSC 420, the top field may not be completely stored in memory 325 at the time it is requested by DPC 440.

If memory 325 contains a bottom field that has been completely buffered, DPC 440 retrieves the bottom field and transmits it as the top field. Subsequently, the top field is retrieved when it has been completely buffered. To prevent the field inversion that may occur by transmitting the top and bottom fields out of order, the first line of the top field, or the last line of the bottom field is dropped depending on whether there a phase mismatch. The last line of the bottom field is dropped to ensure that the same number of lines appear on the display regardless of whether there is a phase match or mismatch.

Figure 10:
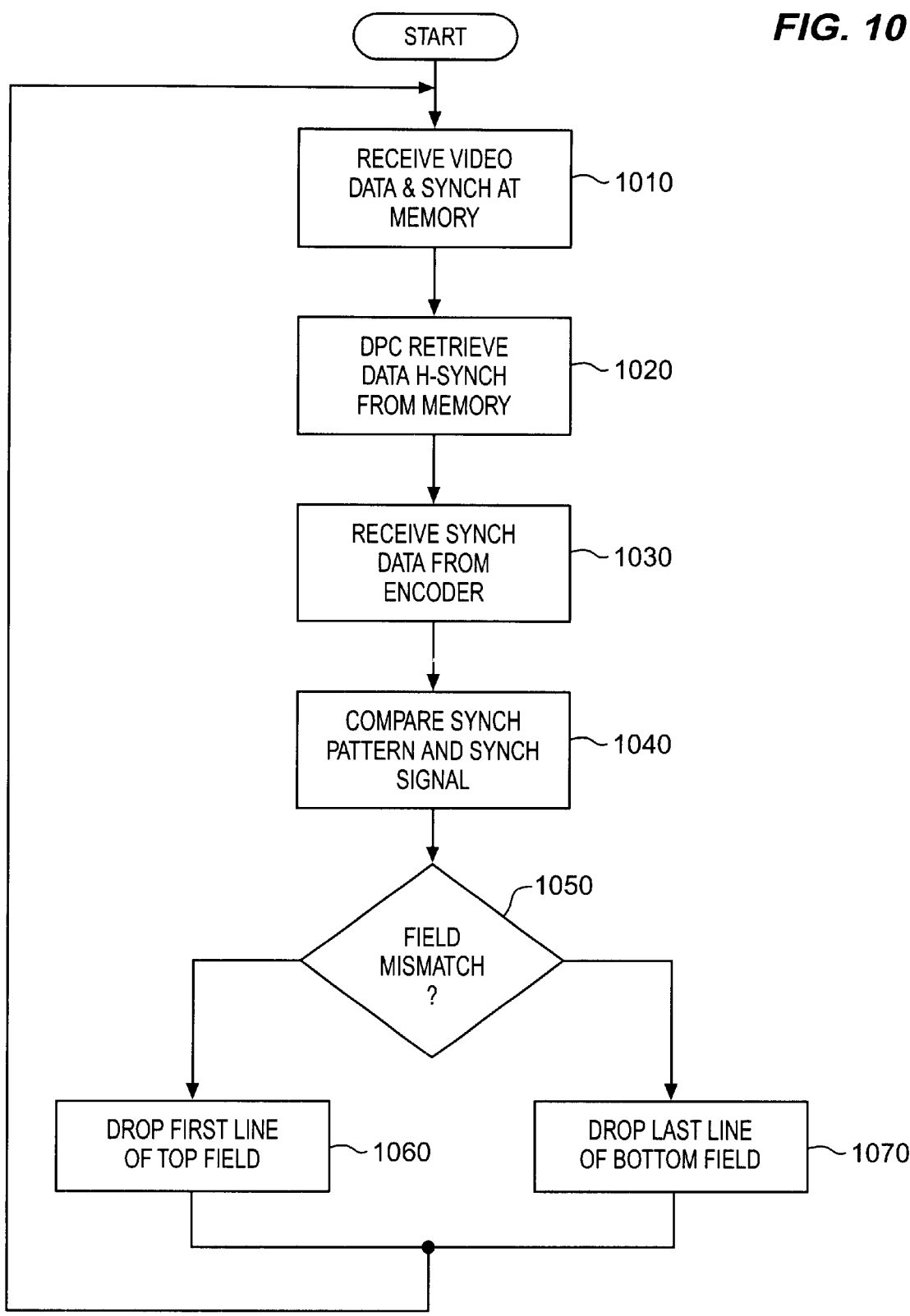
FIG. 10 is a flow diagram of one embodiment for display synchronization.

FIG. 10 is a flow diagram of one embodiment of a display synchronization system used to prevent field inversion. At process block 1010, fields of video data, including the synchronization patterns, are received at memory 325 from VSC 420. Alternatively, the synchronization patterns may be received at memory 325 from a source separate from the video data. At process block 1020, DPC 440 retrieves the field data and the synchronization pattern data stored in memory 325. The synchronization pattern data is received at comparator 948. At process block 1030, synchronization signals are received at field match comparator 948 from encoder 320 via time base unit 942. At process block 1040, the synchronization pattern data is compared to the synchronization signals. At process block 1050, it is determined whether there is a field mismatch between the synchronization pattern data and the synchronization signals.

If there is a field mismatch between the synchronization pattern data and the synchronization signals, the first line of the top field of video data is dropped before being transmitted to the display, process block 1060. If there is a field match, the last line of the bottom field of video data is dropped before being transmitted to the display, process block 1070. One of ordinary skill in the art will recognize that process blocks 1020 and 1030 may be processed in a variety of different sequences. For example, the process disclosed in process block 1030 may be executed before the process in process block 1020. Alternatively, process blocks 1020 and 1030 may be executed in parallel.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as novel.

What is claimed is:

1. An interactive set-top box comprising:

a memory;

a graphics processor coupled to the memory that includes a memory controller, the memory controller comprising:
   a first arbiter;
   a first memory buffer coupled to the first arbiter;
   a second arbiter coupled to the first memory buffer;
   a second memory buffer coupled to the second arbiter; and
   a third arbiter coupled to the second memory buffer; and a central processing unit (CPU) coupled to the memory.

2. The set-top box of claim 1, wherein the graphics processor further comprises a video processor.

3. The set-top box of claim 2 further comprising:

a Motion Picture Expert Group (MPEG) decoder coupled to the graphics processor;

a National Television System Committee (NTSC) decoder coupled to the graphics processor;

an NTSC encoder coupled to the graphics processor; and a modem coupled to the CPU, wherein the modem enables the CPU to access the internet.

4. The set-top box of claim 1, wherein the graphics processor further comprises:

a host interface coupled to the CPU and the memory controller, wherein the host interface receives request from the CPU to access the memory;

an audio processor coupled to the memory controller;

a video capture and scaling unit coupled to the memory controller;

a graphics acceleration unit coupled to the memory controller; and a video display controller coupled to the memory controller.

5. The set-top box of claim 4, wherein the host interface includes:
   a cache coupled to the CPU and the memory controller;
   a read buffer coupled to the CPU and the memory controller; and
   a write buffer coupled to the CPU and the memory controller.

6. The set-top box of claim 4, wherein the video display controller comprises:
   a time base unit; and
   a comparator coupled to the time base unit and the memory.

7. The set-top box of claim 6, wherein the memory stores a first video field and a second video field.

8. The set-top box of claim 7, wherein the comparator compares a first set of synchronization signals received from the time base unit and a second set of synchronization signals received from the memory, and determines whether there is a field mismatch between the first and second set of synchronization signals.

9. The set-top box of claim 8, wherein the video display controller drops a first line of the first video field that is retrieved from the memory and transmitted to a display device if a field mismatch is detected, and wherein the video display controller drops a last line of the second video field that is retrieved from the memory and transmitted to the display device if a field mismatch is not detected.

10. The set-top box of claim 9, wherein the first video field represents a top component of a video image and the second video field represents a bottom component of a video image.

11. The set-top box of claim 1, wherein the memory controller further comprises a history and timing unit coupled to the second memory buffer and the third arbiter.

12. The set-top box of claim 1, wherein the memory is a Synchronous Dynamic Random Access Memory (SDRAM).

13. The set-top box of claim 1 wherein the memory is an Extended Data Output Dynamic Random Access Memory (EDO DRAM).

14. A memory controller comprising:
   a first arbiter to receive memory client requests to access a memory device;
   a first memory buffer coupled to the first arbiter to store the memory client requests selected by the first arbiter;
   a second arbiter coupled to the first memory buffer, wherein the second arbiter receives the memory client requests stored in the first memory buffer;
   a second memory buffer coupled to the second arbiter to store the memory client requests selected by the second arbiter; and
   a third arbiter coupled to the second memory buffer, wherein the third arbiter provides access of the memory device to the memory client requests stored in the second memory buffer.

15. The memory controller of claim 14, further comprising a timing unit to enable the second and third arbiters.

16. The memory controller of claim 14, wherein the first and second arbiters arbitrates according to a priority classification system and the third arbiter arbitrates according to an alternating system.

17. The memory controller of claim 14, wherein the memory client requests include requests from a central processing unit and requests from a graphics processor to access the memory device.

18. A method of providing access to a memory device in an interactive set-top box, the method comprising:
   receiving a first request at a first arbiter from a first memory client;
   determining whether sufficient space is available in a first memory buffer for the first client request;
   if so, storing the first client request in the first memory buffer;
   receiving the first client request at a second arbiter;
   determining whether a second memory buffer contains greater than a predetermined threshold of data;
   if not, storing the first client request in the second memory buffer;
   receiving the first client request at a third arbiter;
   determining whether the first client request has been enabled to arbitrate at the third arbiter; and
   if so, granting access of the memory device to the first client.

19. The method of claim 18 further comprising:
   receiving a second request at the first arbiter from a second memory client;
   determining whether sufficient space is available in the first memory buffer for the second client request;
   if so, determining whether the second client request has a higher priority classification than the first client request;
   if so, transmitting a signal to the second client; and
   transmitting data from the second client to the first memory buffer.

20. The method of claim 19, further comprising:
   transmitting a signal to the first client if it is determined that no sufficient space is available in the first memory buffer for the second client request; and
   transmitting data from the first client to the first memory buffer.

21. The method of claim 19, further comprising:
   transmitting a signal to the first client if it is determined that the first client request has a higher priority classification than the second client request; and
   transmitting data from the first client to the first memory buffer.

22. The method of claim 19, further comprising:
   receiving the second client request at the second arbiter;
   determining whether a row activate command is occurring at the memory device if the second memory buffer contains less than the predetermined threshold; and
   if not, determining whether the first client request in the first memory buffer is to access the same bank of the memory device as a third client request located in the second memory buffer;
   if not, determining whether the second client request in the first memory buffer is to access the same bank of the memory device as the third client request;
   if not, determining whether the second client request has a higher priority classification than the first client request; and
   if so, transmitting data corresponding with the second client request from the first memory buffer to the second memory buffer;
   otherwise, transmitting data corresponding with the first client request from the first memory buffer to the second memory buffer.

23. The method of claim 22, further comprising transmitting data corresponding with the first client request from the first memory buffer to the second memory buffer if it is determined that the second client request is to access the same bank of the memory device as the third client request.

24. The method of claim 22, further comprising transmitting data corresponding with the second client request from the first memory buffer to the second memory buffer if it is determined that the first client request is to access the same bank of the memory device as the third client request.

25. The method of claim 22, further comprising:
determining whether a high priority signal has been received from the second client if it is determined that the first client has a higher priority classification;
if so, determining whether a high priority signal has been received from the first client; and
if not, transmitting data corresponding with the second client request from the first memory buffer to the second memory buffer.

26. The method of claim 22, further comprising transmitting the data corresponding with the first client request from the first memory buffer to a history and timing circuit if the first client has a higher priority classification.

27. The method of claim 22, further comprising transmitting the data corresponding with the second client request from the first memory buffer to a history and timing circuit if the second client has a higher priority classification.

28. The method of claim 22, further comprising:
receiving the second client request at the third memory buffer;
determining whether the second client request has been enabled to arbitrate at the third arbiter;
if so, determining whether a CAS command is in progress at the memory device if arbitration is enabled at the third arbiter;
if not, determining whether the first client request is a CAS command;
if so, determining whether the first client request is a CAS command;
if so, determining whether the second client request has been stored in the third memory buffer for a longer time interval than the first client request; and
if so, granting access of the memory device to the second client;
otherwise, granting access of the memory device to the first client.

29. The method of claim 28, further comprising granting access of the memory device to the first client if it is determined that the second client request has not been enabled to arbitrate at the third arbiter.

30. The method of claim 18, further comprising:
determining whether a row activate command is occurring at the memory device if the second memory buffer contains less than the predetermined threshold; and
if so, determining whether the first client request in the first memory buffer is to access the same bank of the memory device as a second client request located in the second memory buffer.

31. The method of claim 18 further comprising:
determining whether a CAS command is in progress at the memory device if arbitration is enabled at the third arbiter;
if not, determining whether the first client request is a CAS command;
if so, determining whether a second client request in another bank of the third memory has previously accessed the memory device; and
if not, granting access of the memory device to the first client request.

32. A video display controller comprising:
a time base unit; and
a comparator coupled to the time base unit, wherein the comparator compares a first set of synchronization signals received from the time base unit and a second set of synchronization signals received from a memory device, wherein the comparator determines whether there is a field mismatch between the first and second set of synchronization signals;
wherein the video display controller drops a first line of a first video field that is retrieved from the memory device and transmitted to a display device if a field mismatch is detected at the comparator.

33. The video display controller of claim 32, wherein the video display controller drops a last line of a second video field that is retrieved from the memory device and transmitted to the display device if a phase offset is not detected at the comparator.

34. The video display controller of claim 32, wherein the time base unit is coupled to and receives the first set of synchronization signals from a video encoder.

35. A method for synchronizing video data to a display device, the method comprising:
receiving a plurality of video data fields at a memory device;
receiving synchronization pattern signals and encoder synchronization signals at a comparator, wherein the synchronization pattern signals correspond to the video data;
determining whether there is a field mismatch between the synchronization pattern signals and the encoder synchronization signals; and
if so, withholding a first line of a first video data field from being transmitted to a display;
otherwise, withholding a last line of a second video data field from being transmitted to the display.

36. A graphics processor comprising:
a memory controller, coupled to a memory, that controls access to the memory;
a host interface, coupled to the memory controller and a central processing unit (CPU), that receives requests from the CPU to access the memory;
a first arbiter;
a first memory buffer coupled to the first arbiter;
a second arbiter coupled to the first memory buffer;
a second memory buffer coupled to the second arbiter;
a third arbiter coupled to the second memory buffer; and
a history and timing unit coupled to the second memory buffer and the third arbiter.

* * * * *